United States Patent
Nishida et al.

(10) Patent No.: US 9,034,140 B2
(45) Date of Patent: May 19, 2015

(54) ADHESIVE SHEET

(71) Applicant: LINTEC CORPORATION, Tokyo (JP)

(72) Inventors: Takuo Nishida, Tokyo (JP); Akihito Yamada, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 14/033,798

(22) Filed: Sep. 23, 2013

(65) Prior Publication Data

US 2014/0034237 A1 Feb. 6, 2014

Related U.S. Application Data

(63) Continuation of application No. 13/056,815, filed as application No. PCT/JP2009/059754 on May 28, 2009, now abandoned.

(30) Foreign Application Priority Data

Jul. 31, 2008 (JP) ................. 2008-198600

(51) Int. Cl.
| | | |
|---|---|---|
| C09J 7/02 | (2006.01) | |
| C08G 18/62 | (2006.01) | |
| C08G 18/76 | (2006.01) | |
| C08G 18/80 | (2006.01) | |
| C09J 133/06 | (2006.01) | |
| C09J 175/04 | (2006.01) | |

(52) U.S. Cl.
CPC .......... *C09J 7/0217* (2013.01); *Y10T 428/2891* (2015.01); *Y10T 428/2839* (2015.01); *C08G 18/6254* (2013.01); *C08G 18/7621* (2013.01); *C08G 18/7642* (2013.01); *C08G 18/8029* (2013.01); *C08L 2312/00* (2013.01); *C09J 7/0246* (2013.01); *C09J 133/066* (2013.01); *C09J 175/04* (2013.01); *C09J 2423/006* (2013.01); *C09J 2433/00* (2013.01); *C09J 2467/006* (2013.01)

(58) Field of Classification Search
CPC ...................................... C09J 7/0217
USPC ...................................... 156/331.7
See application file for complete search history.

(56) References Cited

U.S. PATENT DOCUMENTS

| 6,432,475 B1 * | 8/2002 | Yamamoto et al. ........ 427/208.4 |
|---|---|---|
| 2005/0196574 A1 | 9/2005 | Nonaka et al. |
| 2006/0024494 A1 | 2/2006 | Amano et al. |
| 2007/0238805 A1 | 10/2007 | Maeda et al. |
| 2009/0042004 A1 * | 2/2009 | Yano et al. .................... 428/220 |

FOREIGN PATENT DOCUMENTS

| JP | 5-105857 | 4/1993 |
|---|---|---|
| JP | 5-263055 | 10/1993 |
| JP | 2000-44896 | 2/2000 |
| JP | 2005-126702 | 5/2005 |
| JP | 2005-154531 | 6/2005 |
| JP | 2005-325250 | 11/2005 |
| JP | 2005-352250 | 12/2005 |
| JP | 2006-2140 | 1/2006 |
| JP | 2006-96956 | 4/2006 |
| JP | 2006-328348 | 12/2006 |
| JP | 2007-153913 | 6/2007 |
| JP | 2007-246882 | 9/2007 |
| JP | 2007246882 A * | 9/2007 |
| JP | 2008-31208 | 2/2008 |
| JP | 2008-214386 | 9/2008 |
| JP | 2008-222967 | 9/2008 |
| JP | 2008222967 A * | 9/2008 |
| WO | 2007/046365 A1 | 4/2007 |

OTHER PUBLICATIONS

International Search Report issued Aug. 18, 2009 in PCT/JP2009/059754.
Machine translation of JP 2008-222967 A (2008).
Machine translation of JP 05-263055 A (1993).
Sigma-Aldrich data sheet for xylylene diisocyanate (2013).
Japanese Office Action issued Dec. 17, 2013, in Japan Patent Application No. 2010-522652.

* cited by examiner

*Primary Examiner* — Daniel Lee
(74) *Attorney, Agent, or Firm* — Oblon, McClelland, Maier & Neustadt, L.L.P.

(57) ABSTRACT

An adhesive sheet having high adhesion and removability, low metal corrosion, small outgas generation, and particularly suitable for adherence to an electronic part, which sheet includes an adhesive layer provided for at least one surface of a substrate sheet, in which a pressure-sensitive adhesive forming the adhesive layer includes a resin composition mainly formed of an acrylic copolymer obtained by blending a carboxyl group-free acrylic copolymer obtained by copolymerizing the following components (A) to (C) with (D) an isocyanate-based cross-linking agent: (A) 76.999 to 94.999% by mass of an alkyl(meth)acrylate; (B) 5.0 to 23.0% by mass of an ethylenically unsaturated group-containing morpholine-based compound; and (C) 0.001 to 1.5% by mass of a functional group-containing unsaturated monomer; and a ratio M2/M1 of the mole number (M2) of isocyanate groups in the component (D) to the mole number (M1) of functional groups in the component (C) is 1.5 to 15.0.

21 Claims, No Drawings

1
ADHESIVE SHEET

This application is a continuation of U.S. application Ser. No. 13/056,815 filed May 3, 2011, which is a National Stage of PCT/JP2009/059754 filed May 28, 2009, both of which are incorporated herein by reference. This application also claims the benefit of JP 2008-198600 filed Jul. 31, 2008.

TECHNICAL FIELD

The present invention relates to an adhesive sheet, in particular, an adhesive sheet which is useful for being adhered to an electronic part, and more specifically, to an adhesive sheet using, as a pressure-sensitive adhesive, a resin composition obtained by blending an acrylic polymer copolymerized by using, as a main component, an alkyl(meth)acrylate and free of any carboxyl group with an isocyanate-based cross-linking agent.

In the adhesive sheet of the present invention, there is not used the unsaturated carboxylic acids such as a (meth)acrylic acid to be generally used as pressure-sensitive adhesive components. Therefore, the resin composition mainly formed of the acrylic copolymer free of any carboxyl group is used as the pressure-sensitive adhesive.

The adhesive sheet of the present invention has a high adhesion despite the fact that the acrylic copolymer in the pressure-sensitive adhesive does not contain any carboxyl group as a side chain. As the adhesive sheet is free of any carboxyl group, the adhesive sheet generates only small amount of outgases, is excellent in removability, and corrodes a metal to a low grade. Accordingly, it is particularly useful as an adhesive sheet for being adhered to an electronic part.

BACKGROUND ART

Resin compositions containing acrylic copolymers each using an alkyl(meth)acrylate as a monomer component have been conventionally often used as pressure-sensitive adhesives in general adhesive sheets or labels. In recent adhesive sheets or labels for electronic parts, an alcohol component derived from a side chain-decomposed product of an acrylic copolymer serves as outgases, and the outgases may cause problems in the operation of the electronic parts. Accordingly, such contrivance as described below is needed. Specifically, there is used a monomer component whose portion serving as a side chain in the acrylic copolymer has a low molecular weight, or there is not used the unsaturated carboxylic acids such as a (meth)acrylic acid that aid the decomposition of the portion serving as a side chain (which may hereinafter be referred to as "(meth)acrylic acid and the like").

In addition, adherends for the adhesive sheets for electronic parts are mainly metals, and the adhesive sheets are used under various environments. Accordingly, the adhesive sheets are each requested to have such performance as to be free of any corrosive action on the metals. The following condition is particularly important in imparting the performance. None of a (meth)acrylic acid and the like responsible for corrosion is used as a monomer.

Meanwhile, carboxyl groups serving as side chains of the acrylic copolymers derived from a (meth)acrylic acid and the like each having high polarity each play an extremely important role in an adhesion for a metal. Accordingly, mere avoidance of the use of a (meth)acrylic acid and the like causes another problem. In other words, in the pressure-sensitive adhesives formed of the resin compositions mainly formed of the acrylic copolymers that do not use a (meth)acrylic acid and the like as their monomers, no improvement in polarity of the entirety of each of the polymers by virtue of a (meth)acrylic acid and the like can be obtained, and an adhesion for a metal adherend is not sufficient. As a result, blisters, release, and the like may occur in the adhesive sheets.

In addition, it has been known that assorted cross-linking promoters are used upon a cross-linking process with an isocyanate-based cross-linking agent. However, the cross-linking promoters are unsuitable for being adhered to electronic parts because of the following reasons. An organotin-based cross-linking promoter (Patent Document 1) is not suitable for use in the application because organotin itself serves as outgases to contaminate an electronic part as well as silicone.

A cross-linking promoter such as an amino group-containing compound (Patent Document 2) has so low a molecular weight as to volatilize at the time of drying to weaken its effect. In addition, it is anxious that the cross-linking promoter may be detected as an outgas component.

In addition, an amino group-containing compound having a high molecular weight is not suitable for the application either because the application of the compound may contaminate an adherend.

Further, it has been proposed that a nitrogen atom-containing copolymerizable monomer such as an amide group-containing monomer which is a high-polarity monomer is used as a monomer component for any one of the acrylic copolymers (Patent Document 3). However, the monomer remarkably increases a Tg of the copolymer, and hence a reduction in wettability occurs. As a result, it causes a problem that a sufficient adhesion cannot be obtained.

In addition, it has been proposed that cross-linking promoters including organozinc compounds such as zinc naphthenate and zinc 2-ethylhexanoate, and organolead compounds such as lead stearate, lead naphthenate, and lead 2-ethylhexanoate are used (Patent Document 4). However, the use of such the cross-linking promoters causes a problem that heavy metals baneful to the human body have to be used.

Patent Document 1: JP 2000-44896 A
Patent Document 2: JP 2005-154531 A
Patent Document 3: JP 2005-325250 A
Patent Document 4: JP 2006-96956 A

DISCLOSURE OF THE INVENTION

Problem to be Solved by the Invention

The present invention has been made in view of such circumstances, and an object of the present invention is to provide the following adhesive sheet, in particular, adhesive sheet for being adhered to an electronic part. Despite a fact that the adhesive sheet uses a carboxyl group-free acrylic copolymer, the adhesive sheet has a high adhesion particularly for a metal adherend. In addition, the adhesive sheet is excellent in removability. As the adhesive sheet is free of any carboxyl group, the adhesive sheet not only corrodes a metal to small extent but also generates only small amount of outgases.

Means for Solving the Problem

To achieve the above-mentioned object, the inventors of the present invention have found that the above-mentioned object can be achieved by using an ethylenically unsaturated group-containing morpholine-based compound and small amount of a functional group-containing unsaturated monomer as one of the copolymerizable monomer components of which an acrylic copolymer is formed. Thus, the inventors have completed the present invention.

That is, the present invention provides the following adhesive sheet.

(1) An adhesive sheet, comprising an adhesive layer provided for at least one surface of a substrate sheet,
wherein a pressure-sensitive adhesive of which the adhesive layer is formed comprises a resin composition mainly formed of an acrylic copolymer obtained by blending a carboxyl group-free acrylic copolymer obtained by copolymerizing the following components (A) to (C) with (D) an isocyanate-based cross-linking agent:
(A) 76.999 to 94.999% by mass of an alkyl(meth)acrylate;
(B) 5.0 to 23.0% by mass of an ethylenically unsaturated group-containing morpholine-based compound; and
(C) 0.001 to 1.5% by mass of a functional group-containing unsaturated monomer; and
a ratio M2/M1 of the mole number (M2) of isocyanate groups in the component (D) to the mole number (M1) of functional groups in the component (C) is 1.5 to 15.0.

(2) The adhesive sheet according to the above item (1), wherein the ratio M2/M1 is 2.0 to 10.0.

(3) The adhesive sheet according to the above item (1), wherein the component (C) includes an unsaturated monomer having a hydroxyl group.

(4) The adhesive sheet according to the above item (1), wherein the isocyanate-based cross-linking agent (D) includes xylylene diisocyanates.

(5) The adhesive sheet according to the above item (1), wherein the alkyl(meth)acrylate (A) includes n-butyl acrylate.

(6) The adhesive sheet according to the above item (1), wherein the release layer surface of a release sheet formed of a release substrate and a non-silicone-based release layer is laminated on the adhesive layer surface of the adhesive sheet.

(7) The adhesive sheet according to the above item (1), wherein the adhesive sheet generates outgases in an amount of less than 0.5 µg/cm² in terms of n-decane.

(8) The adhesive sheet according to the above item (1), wherein the adhesive sheet is a sheet to be adhered to an electronic part.

(9) The adhesive sheet according to the above item (8), wherein the electronic part includes a hard disk drive.

Effects by the Invention

The adhesive sheet of the present invention has the following effects. Despite the fact that the adhesive sheet uses a pressure-sensitive adhesive containing a carboxyl group-free acrylic copolymer, the adhesive sheet has a high adhesion for a metal adherend. In addition, the adhesive sheet is excellent in removability. Moreover, the adhesive sheet does not corrode a metal so much, and further, generates only small amount of outgases.

BEST MODE FOR CARRYING OUT THE INVENTION

A carboxyl group-free acrylic copolymer of which an adhesive layer in an adhesive sheet of the present invention is formed is obtained by copolymerizing a monomer mixture containing an alkyl(meth)acrylate as a component (A), an ethylenically unsaturated group-containing morpholine-based compound as a component (B), and a functional group-containing unsaturated monomer as a component (C) in specific amounts each.

An alkyl(meth)acrylate in which the alkyl group has 1 to 12 carbon atoms can be used as the alkyl(meth)acrylate as the component (A). Specifically, there are given methyl(meth)acrylate, ethyl(meth)acrylate, propyl(meth)acrylate, butyl(meth)acrylate, pentyl(meth)acrylate, hexyl(meth)acrylate, 2-ethyl hexyl(meth)acrylate, octyl(meth)acrylate, decyl(meth)acrylate, and the like. Of those, the component (A) is preferably formed only of butylacrylate, and more specifically, n-butylacrylate from such a viewpoint that an adhesive layer having balanced pressure-sensitive adhesive properties is obtained. One kind of those (meth)acrylates may be used alone, or two or more kinds thereof may be used in combination.

Of those, butyl(meth)acrylate or 2-ethylhexyl(meth)acrylate is preferably used from such viewpoints that the pressure-sensitive adhesive properties are balanced with tackiness or a cohesion and that the boiling points of a residual monomer after the polymerization and a side chain-decomposed product are sent down so that the monomer and the product may be removed by volatilization as a result of heat drying at the time of coating with a pressure-sensitive adhesive.

The above-mentioned component (A) is requested to be used at a content of 76.999 to 94.999% by mass based on 100% by mass of the total amount of the components (A) to (C). The content falls within the range of preferably about 80.0 to 90.0% by mass, particularly preferably 80.0 to 85.0% by mass particularly in terms of a balance between the adhesion and removability of the pressure-sensitive adhesive.

In the present invention, none of the unsaturated carboxylic acids such as a (meth)acrylic acid that are monomers each having high polarity is used in the acrylic copolymer. Instead, the ethylenically unsaturated group-containing morpholine-based compound is used as the component (B).

Examples of the ethylenically unsaturated group-containing morpholine-based compound include N-vinylmorpholine, N-allylmorpholine, and N-(meth)acryloylmorpholine each serving as an ethylenically unsaturated monomer having a six-membered heterocyclic ring having a nitrogen atom and an oxygen atom.

Of those, N-(meth)acryloylmorpholine is preferably used from such a viewpoint that the component is copolymerizable well with the component (A) and the component (C). One kind of those compounds may be used alone, or two or more kinds thereof may be used in combination.

In addition, an ethylenically unsaturated group-containing imidazole-based compound may be added for improving cross-linking reactivity together with the ethylenically unsaturated group-containing morpholine-based compound as the component (B). Specific examples of the compound include N-vinylimidazole, N-allylimidazole, and N-(meth)acryloylimidazole.

The above-mentioned component (B) is requested to be used at a content of 5.0 to 23.0% by mass based on 100% by mass of the total amount of the components (A) to (C). The content falls within the range of preferably 10.0 to 20.0% by mass in terms of a balance between the adhesion and removability of the pressure-sensitive adhesive.

The component (B) in the acrylic copolymer of which the adhesive layer in the adhesive sheet of the present invention is formed is incorporated into the copolymer and contains a morpholine structure at a side chain thereof. The morpholine structure serves as a cross-linking promoter in a cross-linking reaction between the isocyanate-based cross-linking agent as the component (D) and a functional group derived from the functional group-containing unsaturated monomer as the component (C). As a result, none of such problems due to cross-linking promoters having a low molecular weight as described above occurs in the adhesive sheet.

Subsequently, the functional group-containing unsaturated monomer as the component (C) is described.

In the present invention, a hydroxyl group-containing compound and/or an amide group-containing compound are each/is used as the functional group-containing unsaturated monomer.

Examples of the hydroxyl group-containing compound include hydroxyalkyl(meth)acrylates such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, and 4-hydroxybutyl(meth)acrylate. One kind of the compounds may be used alone, or two or more kinds thereof may be used in combination.

Examples of the amide group-containing compound include acrylamide-based monomers such as acrylamide, N,N-dimethyl acrylamide, N,N-dimethyl methacrylamide, N-methylol acrylamide, and N-methylol methacrylamide. One kind of the compounds may be used alone, or two or more kinds thereof may be used in combination.

It should be noted that the amide group-containing compound is hardly applicable to the present invention because of the following reason. Although the compound is a monomer having high polarity, the addition of an excessive amount of the compound increases the Tg of the copolymer to cause a reduction in wettability, and as a result, a sufficient adhesion cannot be obtained. Therefore, the compound, if used, is preferably used in as small amount as possible.

In the present invention, the hydroxyl group-containing compound is preferably used as the functional group-containing unsaturated monomer as the component (C) because the color of the compound does not change owing to heat and the like.

In the present invention, the unsaturated carboxylic acids such as a (meth)acrylic acid are requested not to be used as the functional group-containing unsaturated monomer as the component (C). As a result, an acrylic copolymer completely free of any carboxyl group as a side chain is obtained, and hence an adhesive sheet particularly useful for being adhered to an electronic part can be provided.

The component (C) is requested to be used at a content of 0.001 to 1.5% by mass based on 100% by mass of the total amount of the components (A) to (C). The content is preferably about 0.1 to 1.2% by mass, particularly preferably about 0.2 to 0.8% by mass in terms of a balance between the adhesion and removability of the pressure-sensitive adhesive.

In the present invention, an ethylenically unsaturated monomer except the components (A) to (C) and the unsaturated carboxylic acids such as styrene, vinyl acetate, or a (meth)acrylonitrile can be added as any other monomer component to the acrylic copolymer as required at the time of the polymerization.

In the present invention, the acrylic copolymer used in the pressure-sensitive adhesive is preferably produced by dissolving the monomer mixture in, for example, a hydrocarbon-based organic solvent such as toluene or xylene, or an ester-based organic solvent such as ethyl acetate, adding a conventionally known azo-based polymerization initiator such as azobisisobutyronitrile, 2,2'-azobis(2-aminodipropane)dihydrochloride, or 4,4'-azobis(4-cyanovaleric acid), or a conventionally known peroxide-based polymerization initiator such as benzoyl peroxide to the solution, and subjecting the mixture to radical polymerization.

The above-mentioned polymerization initiator is used in an amount in the range of preferably 0.01 to 5 parts by mass and particularly preferably 0.1 to 1 part by mass based on 100 parts by mass of the monomer mixture.

In the polymerization reaction, the amounts of the monomer mixture and the polymerization initiator in the polymerization system gradually reduce in association with the progress of the polymerization. In the later stage of the polymerization, the probability that both the mixture and the initiator encounter each other becomes so low that the monomer mixture remains in the system. It is not preferred that the remaining monomer mixture remain in the pressure-sensitive adhesive because the remaining monomer mixture is responsible for a stench of the adhesive sheet or is a compound having irritation or toxicity in many cases. The fractionation of a trace amount (several percent or less based on the loaded monomers) of the remaining monomer mixture from the polymer is not preferred from the viewpoint of energy economical efficiency. Therefore, adopted is an approach involving adding, to the system, a polymerization initiator which is added later called a booster on the verge of the termination of the polymerization, and polymerizing the remaining monomer mixture to the extent possible to reduce the amount of the remaining monomer mixture.

A solution of the acrylic copolymer in the organic solvent is obtained by performing the radical polymerization under heating at typically about 10 to 100° C., preferably about 50 to 90° C. for about 1 to 20 hours, preferably about 3 to 10 hours.

The resultant carboxyl group-free acrylic copolymer has a weight-average molecular weight of typically 200,000 or more, preferably 400,000 to 2,000,000, more preferably 500,000 to 1,000,000.

An available approach to increasing the molecular weight is, for example, a method involving selecting a solvent that hardly undergoes a chain transfer as the solvent, a method involving increasing the concentration of the monomer mixture in the reaction solution (reducing the concentration of the solvent for preventing a chain transfer to the solvent), a method involving reducing the concentration (based on the monomers) of the polymerization initiator, or a method involving performing the polymerization at a relatively low reaction temperature. A carboxyl group-free acrylic copolymer having such weight-average molecular weight as described above can be obtained by combining two or more of those methods to perform the polymerization.

The pressure-sensitive adhesive in the present invention, which uses the carboxyl group-free acrylic copolymer as a main resin component, is used as a resin composition blended with the isocyanate-based cross-linking agent as the component (D) in order that the acrylic copolymer may be cross-linked A polyisocyanate-based cross-linking agent is suitable as the isocyanate-based cross-linking agent.

The polyisocyanate-based cross-linking agent is a compound having 2 or more isocyanate groups in a molecule. Specific examples of the compound include xylylene diisocyanate (XDI), tolylene diisocyanate (TDI), tetramethylene diisocyanate, hexamethylene diisocyanate (HMDI), isophorone diisocyanate (IPDI), hydrogenated tolylene diisocyanate, diphenylmethane diisocyanate, and hydrogenated diphenylmethane diisocyanate, and polyisocyanate compounds obtained by adding these diisocyanates to trimethylolpropane and the like, isocyanurated products, adduct-type compounds, and burette-type compounds. Further examples include urethane prepolymer-type polyisocyanates obtained by subjecting those diisocyanates to addition reactions with known polyether polyols, polyester polyols, acrylic polyols, polybutadiene polyols, polyisoprene polyols, and the like.

Of those, xylylene diisocyanate (XDI), in particular, an adduct-type xylylene diisocyanate modified with trimethylolpropane is preferred from the viewpoints of the rate of the cross-linking reaction with the functional group and the removability.

One kind of those cross-linking agents may be used alone, or two or more kinds thereof may be used in combination.

The cross-linking agent as the component (D) is requested to be used in such an amount that a ratio M2/M1 of the mole number (M2) of the isocyanate groups in the component (D) to the mole number (M1) of the functional groups in the component (C) is 1.5 to 15.0. The ratio is preferably 2.0 to 10.0, more preferably 2.5 to 8.0 from such a viewpoint that a moderate adhesion is secured.

The ratio may also be 1.5 to 9.0 or 1.7 to 6.0.

Setting the ratio M2/M1 to 1.5 or more improves adhesion with a substrate and results in the expression of the removability. Setting the ratio M2/M1 to 15.0 or less prevents a reduction in adhesion and can suppress the remaining of the isocyanate groups in the pressure-sensitive adhesive.

The adhesive sheet of the present invention has the adhesive layer formed by using the resin composition prepared as described above, and the form of the adhesive sheet is not particularly limited. Available is, for example, any one of an adhesive sheet having the adhesive layer on one surface of the substrate sheet, an adhesive sheet having the adhesive layer on each of both surfaces of the substrate sheet, such an adhesive sheet that no substrate sheet is used and the adhesive layer is interposed between two release sheets, and such an adhesive sheet that the adhesive layer is provided for one surface of a release sheet both surfaces of which are each subjected to a release treatment and the resultant is wound in a roll fashion (a release agent and a release sheet are described later in detail).

The thickness of the adhesive layer is not particularly limited, and is appropriately selected depending on, for example, the applications of the adhesive sheet. The thickness is selected from the range of typically 5 to 100 μm, preferably 10 to 60 μm.

The adhesive layer is desirably formed by coating the substrate sheet or the release layer surface of any such release sheet with the pressure-sensitive adhesive by a conventionally known method such as a spin coating method, a spray coating method, a bar coating method, a knife coating method, a roll coating method, a blade coating method, a die coating method, or a gravure coating method, and heating the resultant at a temperature of 80 to 150° C. for 30 seconds to 5 minutes in order that the remaining of the solvent or low-boiling components may be prevented.

The substrate sheet is not particularly limited, and any one of the various sheets can be used. Specific examples of the available sheets include: sheets formed of resins such as polyolefins including polyethylene and polypropylene, polyesters including polyethylene terephthalate, polyethylene terenaphthalate, and polybutylene terephthalate, polyimides, and polyamides; products obtained by depositing metals such as aluminum from the vapor onto these sheets; papers formed of woodfree paper, impregnated paper, and the like; metal foils such as an aluminum foil, a copper foil, and an iron foil; nonwoven fabrics; and synthetic paper.

The thickness of each of those substrate sheets, which is not particularly limited and typically falls within the range of about 2 to 200 μm, preferably falls within the range of about 10 to 150 μm in terms of ease of handling.

In the adhesive sheet of the present invention, a release sheet can be provided on the adhesive layer as desired. Examples of the release sheet include products each obtained by coating a release agent to any one of: paper substrates made of a glassine paper, a coated paper, a woodfree paper, and the like; laminated papers obtained by laminating thermoplastic resins such as polyethylene and polypropylene on these paper substrates; paper substrates obtained by subjecting the above-mentioned substrates to filling treatments with cellulose, starch, polyvinyl alcohol, an acryl-styrene resin, and the like; and plastic films such as polyester films made of polyethylene terephthalate, polybutylene terephthalate, polyethylene naphthalate, and the like, and polyolefin films made of polyethylene, polypropylene, and the like, and films obtained by subjecting these plastic films to easy-adhesion treatments.

Examples of the release agent to be used for forming a release agent layer include: an olefin-based resin, rubber-based elastomers such as an isoprene-based resin, and a butadiene-based resin; long-chain alkyl-based resins; alkyd-based resins; fluorine-based resins; and silicone-based resins. When the adhesive sheet of the present invention is used as an information label at the time of the production or management of a hard disk drive, the use of a silicone-based release agent results in the transfer of a trace amount of a silicone component from the release agent layer to the adhesive layer, and further, the component may adhere to the hard disk drive to form an oxide or the like on a recording disk or reading head in the hard disk drive, thereby damaging a function of the hard disk drive. Therefore, when the adhesive sheet of the present invention is used in hard disk drive applications, a non-silicone-based release agent is preferably used. In addition, when a silicone-based release agent is used as a release agent, a release agent whose silicone component transfers in small amount to the adhesive layer is desirably selected.

The thickness of the release agent layer formed on the substrate, which is not particularly limited, is preferably 0.01 to 2.0 μm, more preferably 0.03 to 1.0 μm when coating is performed with the release agent in a solution state.

When the release agent layer is formed by using a thermoplastic resin such as polyethylene or polypropylene, the thickness of the release agent layer is preferably 3 to 50 μm, more preferably 5 to 40 μm.

The adhesive sheet of the present invention produced as described above has such characteristics as to be excellent in adhesion and removability, and to generate small amount of outgases. In the present invention, the amount of the generated outgases is compared in terms of n-decane.

When heated at a temperature of 120° C. for 10 minutes, the adhesive sheet of the present invention generates outgases in an amount (A) of preferably less than 0.5 μg/cm$^2$, more preferably 0.3 μg/cm$^2$ or less in terms of n-decane, and further, does not corrode any adherend. Accordingly, the possibility that the sheet causes an electronic part to which the sheet is adhered to malfunction significantly reduces, and hence the sheet is particularly suitable for being adhered to a precision electronic part.

It should be noted that, when the adhesive sheet of the present invention has a release sheet, the amount of the generated outgases is a value measured after the release sheet has been removed by release. In addition, a specific method of measuring the amount of the generated outgases is described in detail in "Examples".

Precision electronic parts to which the adhesive sheet of the present invention is applied for the purposes of, for example, an information label, fixation, and insulation are, for example, hard disk drives, semiconductor parts such as an expansion memory and an IC card, semiconductor production apparatuses, relay switches, and wiring boards.

EXAMPLES

Hereinafter, the present invention is described in more detail by way of examples and comparative examples. However, the present invention is by no means limited by these examples.

It should be noted that, in the examples and the comparative examples, the terms "part(s)" and "%" mean "part(s) by mass" and "% by mass", respectively, and a weight-average molecular weight is a weight-average molecular weight in terms of polystyrene measured by gel permeation chromatography (GPC).

Example 1

<Preparation of Carboxyl Group-Free Acrylic Copolymer>

A monomer mixture was prepared by mixing 84.8 parts of n-butyl acrylate [represented as "BA" in the table] as a component (A), 15.0 parts of N-acryloylmorpholine [represented as "ACMO" in the table] as a component (B), and 0.2 part of 2-hydroxyethyl acrylate [represented as "HEA" in the table] as a component (C) in a reactor.

The monomer mixture was mixed with 0.1 part of azobisisobutyronitrile as a polymerization initiator and 150 parts of ethyl acetate as a solvent. While the resultant mixture was stirred, its temperature was increased to 75° C. so that a polymerization reaction was performed. Further, the polymerization was completed at the temperature over 8 hours while a polymerization catalyst solution prepared by dissolving 0.1 part of azobisisobutyronitrile in 10 parts of toluene was sequentially added.

After the completion of the polymerization, a diluent solvent (a mixed solution of toluene and ethyl acetate at a mass ratio of 1/1) was added to the resultant. Thus, a 35% solution of a carboxyl group-free acrylic copolymer having a weight-average molecular weight of 700,000 was produced.

<Preparation of Resin Composition Mainly Formed of Acrylic Copolymer>

A solution of a resin composition was prepared by blending 100 parts of the above-mentioned solution of the carboxyl group-free acrylic copolymer (having a solid content of 35% by mass) with 0.6 part of a trimethylolpropane-modified xylylene diisocyanate [represented as "XDI" in the table]-based cross-linking agent (trade name "Takenate D110N", manufactured by Mitsui Chemicals Polyurethane, Inc., molecular weight: 698, trifunctional, solid content: 75% by mass). The solution was defined as a "pressure-sensitive adhesive A".

<Production of Adhesive Sheet>

A polyethylene terephthalate (PET) film having a thickness of 38 μm [COSMOSHINE A4100 manufactured by TOYOBO CO., LTD.] was used as a substrate sheet, and was then coated with the resultant solution of the resin composition so that a thickness after drying was 25 μm. After that, the resultant was dried at 120° C. for 2 minutes. Thus, an adhesive layer was formed. Subsequently, the release agent layer surface of a release sheet having a release agent layer was attached to the adhesive layer surface. Thus, an adhesive sheet was produced. The sheet was aged under the conditions of a room temperature of 23° C. and a humidity of 50% for 7 days.

A polyethylene terephthalate film having a thickness of 38 μm [manufactured by Mitsubishi Polyester Film GmbH, trade name "T100"] was prepared as a release sheet substrate, and then one surface of the film was coated with an undercoat liquid so that a thickness after drying was 0.15 μm. The resultant was heated and dried at 100° C. for 1 minute. Thus, an undercoat layer was formed. The undercoat liquid was prepared by diluting 100 parts by mass of a polyurethane solution (manufactured by Dainippon Ink and Chemicals Inc., trade name "CRISVON 5150S", solid content: 50% by mass) and 5 parts by mass of an isocyanate-based cross-linking agent (manufactured by Dainippon Ink and Chemicals Inc., trade name "CRISVON NX", solid content: 30% by mass) with methyl ethyl ketone so that a solid content was 1% by mass.

Subsequently, in order that a release agent layer was formed, a release agent solution was prepared by: adding 100 parts by mass of 1,4-polybutadiene (manufactured by JSR Corporation, trade name "BR-01", solid content: 5% by mass) and 1 part by mass of an antioxidant (manufactured by Ciba Specialty Chemicals, trade name "IRGANOX HP2251"); and diluting the mixture with toluene so that a solid content was 0.5% by mass. The top of the above-mentioned undercoat layer was coated with the release agent solution so that a thickness after drying was 0.1 μm. The resultant was heated at 100° C. for 30 seconds. Thus, the release agent layer was formed.

Subsequently, the release agent layer was irradiated with ultraviolet ray from a belt conveyer-type ultraviolet ray irradiation apparatus equipped with one Fusion H bulb of 240 W/cm under the condition of a conveyer speed of 40 m/min (ultraviolet irradiation condition: 100 mJ/cm$^2$), and was then cured. Thus, a release sheet having the undercoat layer and the release agent layer on one surface of the release sheet substrate was obtained.

Examples 2 and 3

Solutions of resin compositions were each prepared in the same manner as in Example 1 except that: a tolylene diisocyanate [represented as "TDI" in Table 1]-based cross-linking agent (manufactured by TOYO INK MFG. CO., LTD., trade name "BHS8515", solid content: 37.5% by mass) or a hexamethylene diisocyanate [represented as "HMDI" in the table]-based cross-linking agent (manufactured by Mitsui Chemicals Polyurethane, Inc., trade name "Takenate D165N", solid content: 100% by mass) was used as the component (D) instead of XDI; and the amount of each component was changed to that shown in Table 1. The respective solutions of the resin compositions were defined as "pressure-sensitive adhesives B and C". Adhesive sheets were each produced in the same manner as in Example 1 except that the "pressure-sensitive adhesive B or C" was used.

It should be noted that the adhesive sheets produced by using the "pressure-sensitive adhesives B and C" were each aged under the conditions of a temperature of 40° C. and a humidity of 50% for 7 days.

Examples 4 to 15 and Comparative Examples 1 to 5

Solutions of resin compositions were each prepared in the same manner as in Example 1 except that a ratio among the amounts of the components (A) to (D) was changed to that shown in Table 1 to be described later. The respective solutions of the resin compositions were defined as "pressure-sensitive adhesives D to U". Adhesive sheets were each produced in the same manner as in Example 1 except that any one of the "pressure-sensitive adhesives D to U" was used.

Comparative Example 6

A solution of a resin composition was prepared in the same manner as in Example 1 except that 1 part of the same tolylene diisocyanate-based cross-linking agent as that of Example 2 was blended into 100 parts of an acrylic pressure-sensitive adhesive [n-butylacrylate/acrylic acid/2-hydroxyethylacrylate=95/4/1 (mass ratio, solid content:40%), weight-average molecular weight: 500,000]. The solution was defined as a "pressure-sensitive adhesive V". An adhesive sheet was produced in the same manner as in Example 1 except that the "pressure-sensitive adhesive V" was used.

Examples 16 to 21 and Comparative Examples 7 and 8

Solutions of resin compositions were each prepared in the same manner as in Example 1 except that a ratio among the amounts of the components (A) to (D) was changed to that shown in Table 1 described later. The respective solutions of the resin compositions were defined as "pressure-sensitive adhesives A' to H'". Adhesive sheets were each produced in the same manner as in Example 1 except that any one of the "pressure-sensitive adhesives A' to H'" was used.

Each of the adhesive sheets of Examples 1 to 21 and Comparative Examples 1 to 8 thus obtained was evaluated for its properties in accordance with the following methods. Table 1 described later shows the results as well.

<Adhesion>

After having been produced and aged for 7 days, the adhesive sheets were each adhered to a stainless steel plate under a 23° C., 50% RH environment. At the period of 24 hours after having been adhered, a 180° peeling adhesion (N/25 mm) was measured in conformity with the method of measuring an adhesion of JIS Z 0237.

<Ball Tackiness>

After having been produced and aged for 7 days, the adhesive sheets were each measured for their ball tackiness in conformity with JIS Z 0237.

<Amount of Generated Outgases>

The amount of generated outgases was measured with a Purge & Trap GC Mass [JHS-100A manufactured by Nihon Denshi Kogyo Co., Ltd.]. A sample (20 cm$^2$) was sealed in an ampoule bottle. The ampoule bottle was heated with the Purge & Trap GC Mass at 120° C. for 10 minutes, and then outgases were collected. After that, the outgases were introduced into a GC Mass Spectrometer (Turbo Mass manufactured by Perkin Elmer, Inc.), and then the amount of the generated outgases was determined from a calibration curve, which had been prepared with n-decane, in terms of n-decane (μg/cm$^2$).

<Removability>

The above-mentioned adhesive sheets were produced and aged for 7 days. After that, each of the adhesive sheets was cut into a size measuring 25 mm by 50 mm, and then the cut piece was adhered to a stainless steel plate. After that, the resultant was left to stand under the conditions of 60° C. and 95% RH for 7 days, and then the adhesive sheet was removed. Removability in this case was measured. The case where smooth release of the adhesive layer of the adhesive sheet from the surface of the stainless steel plate was attained without the remaining of any pressure-sensitive adhesive on the stainless steel plate was marked as "∘". The case where the adhesive layer showed a cohesive failure and partially remained on the surface of the stainless steel plate was marked as "Cf".

<Remaining Isocyanate Groups (Represented as "Remaining NCO Groups" in the Table)>

Isocyanate groups remaining in the pressure-sensitive adhesives of the adhesive sheets that had been aged for 7 days were measured by infrared spectroscopy. The case where an absorption peak was observed near 2,250 cm$^{-1}$ was represented as "present", and the case where no such peak was observed was represented as "absent".

<Corrosiveness in Copper Plate>

After having been produced, the adhesive sheets were aged for 7 days. Each of the adhesive sheets was cut into a size measuring 25 mm by 50 mm, and then the cut piece was adhered to a copper plate. After that, the resultant was left to stand under the conditions of 60° C. and 95% RH for 7 days, and then the adhesive sheet was removed. A change in external appearance of the surface of the copper plate was visually observed after removed the adhesive sheet.

∘: The external appearance did not change.

x: The external appearance changed.

<Release Forces>

There were measured the release force at an ordinary state and the release force at a thermally accelerated state of each in the release sheets of the adhesive sheets of the respective examples and the respective comparative examples.

The release forces were measured as described below.

The adhesive sheets were produced and aged for 7 days. After that, each of the adhesive sheets obtained in the respective examples and the respective comparative examples was cut so as to measure 50 mm width by 200 mm length. The release force at an ordinary state was measured in conformity with JIS-Z0237 by peeling the adhesive sheet with a tensile tester at room temperature and a speed of 300 mm/min in a 180° direction while fixing the release sheet.

The adhesive sheets were produced and aged for 7 days. After that, each of the adhesive sheets was left to stand under the condition of a temperature of 70° C. (in a thermostatic oven of 70° C.) for 168 hours. After that, the adhesive sheet was left to stand under the conditions of 23° C. and 50% RH for 24 hours. After that, the release force at a thermally accelerated state in the adhesive sheet was measured in the same manner as in the case of the release force at an ordinary state.

<Holding Power>

In the respective examples and the respective comparative examples, the adhesive sheets were produced and aged for 7 days. After that, each of the adhesive sheets was cut into a test piece measuring 25 mm by 100 mm. The test piece was adhered to an adherend (SUS304) so that an attachment area measured 25 mm by 25 mm under a 23° C., 50% RH environment. Thus, a test sample was obtained.

After that, the holding power of the sample was measured by applying a load (9.8 N) to the sample with a weight of 1 kg under a 40° C. environment. It should be noted that a test time was set to 70,000 seconds and the numerical value "70,000" in Table 1 means that the weight did not fall even after a lapse of 70,000 seconds (in conformity with JIS Z0237). A numerical value except 70,000 represents a time period (seconds) required for the weight to fall.

TABLE 1

| Examples and Comparative Examples | Pressure-sensitive adhesive | (A) BA part(s) by mass | (B) ACMO part(s) by mass | (C) HEA part(s) by mass | (D) Addition amount of XDI part(s) by mass | Adhesion (N/25 mm) | Ball tackiness (No.) | Amount of generated outgases (μg/cm2) | Removability | Remaining NCO groups | Corrosiveness in copper plate | Release forces (mN/50 mm) Ordinary state | Release forces (mN/50 mm) Thermally accelerated state | Holding power (seconds) | OH (10-3 mol) | NCO (10-3 mol) | M2/M1 (NCO/OH) | Release force ratio (at a thermally accelerated state/at an ordinary state) |
|---|---|---|---|---|---|---|---|---|---|---|---|---|---|---|---|---|---|---|
| Example 1 | A | 84.8 | 15.0 | 0.2 | 0.6 | 13.9 | 8 | 0.03 | ○ | Absent | ○ | 331 | 383 | 70,000 | 0.6 | 1.9 | 3.1 | 1.16 |
| Example 2 | B | 84.8 | 15.0 | 0.2 | 3.0 (TDI) | 7.2 | 6 | 0.02 | ○ | Absent | ○ | 321 | 378 | 70,000 | 0.6 | 5.0 | 8.3 | 1.16 |
| Example 3 | C | 84.8 | 15.0 | 0.2 | 0.6 (HMDI) | 11.4 | 7 | 0.03 | ○ | Absent | ○ | 312 | 398 | 70,000 | 0.6 | 3.0 | 5.0 | 1.28 |
| Example 4 | D | 84.5 | 15.0 | 0.5 | 1.0 | 13.8 | 7 | 0.03 | ○ | Absent | ○ | 321 | 373 | 70,000 | 1.5 | 3.2 | 2.1 | 1.16 |
| Example 5 | E | 84.2 | 15.0 | 0.8 | 1.3 | 11.4 | 5 | 0.03 | ○ | Absent | ○ | 311 | 367 | 70,000 | 2.4 | 4.2 | 1.8 | 1.18 |
| Example 6 | F | 83.9 | 15.0 | 1.1 | 1.7 | 9.8 | 5 | 0.02 | ○ | Absent | ○ | 300 | 331 | 70,000 | 3.3 | 5.5 | 1.7 | 1.10 |
| Comparative Example 1 | G | 83.0 | 15.0 | 2.0 | 2.4 | 4.5 | 3 | 0.02 | ○ | Absent | ○ | 267 | 340 | 70,000 | 6.0 | 7.7 | 1.3 | 1.27 |
| Comparative Example 2 | H | 84.5 | 15.0 | 0.5 | 0 | 18.2 | 12 | 0.02 | Cf | Absent | ○ | 335 | 411 | 1,349 | 1.5 | 0 | 0 | 1.23 |
| Comparative Example 3 | I | 84.5 | 15.0 | 0.5 | 0.2 | 15.6 | 9 | 0.03 | Cf | Absent | ○ | 321 | 400 | 7,819 | 1.5 | 0.64 | 0.4 | 1.25 |
| Example 7 | J | 84.5 | 15.0 | 0.5 | 0.8 | 14.4 | 8 | 0.02 | ○ | Absent | ○ | 281 | 381 | 70,000 | 1.5 | 2.6 | 1.7 | 1.36 |
| Example 8 | K | 84.5 | 15.0 | 0.5 | 1.0 | 13.8 | 7 | 0.03 | ○ | Absent | ○ | 321 | 373 | 70,000 | 1.5 | 3.2 | 2.1 | 1.16 |
| Example 9 | L | 84.5 | 15.0 | 0.5 | 1.2 | 12.2 | 7 | 0.03 | ○ | Absent | ○ | 291 | 354 | 70,000 | 1.5 | 3.9 | 2.6 | 1.22 |
| Example 10 | M | 84.5 | 15.0 | 0.5 | 2.3 | 9.5 | 7 | 0.04 | ○ | Absent | ○ | 293 | 365 | 70,000 | 1.5 | 7.4 | 4.9 | 1.25 |
| Example 11 | N | 84.5 | 15.0 | 0.5 | 3.5 | 7.2 | 7 | 0.04 | ○ | Absent | ○ | 287 | 355 | 70,000 | 1.5 | 11.3 | 7.5 | 1.24 |
| Comparative Example 4 | P | 99.5 | 0.0 | 0.5 | 1.0 | 4.8 | 18 | 0.03 | Cf | Present | ○ | 454 | 543 | 51,423 | 1.5 | 3.2 | 2.1 | 1.20 |
| Example 12 | Q | 89.5 | 10.0 | 0.5 | 1.0 | 10 | 10 | 0.03 | ○ | Absent | ○ | 298 | 312 | 70,000 | 1.5 | 3.2 | 2.1 | 1.05 |
| Example 13 | R | 84.5 | 15.0 | 0.5 | 1.0 | 13.8 | 7 | 0.03 | ○ | Absent | ○ | 321 | 373 | 70,000 | 1.5 | 3.2 | 2.1 | 1.16 |
| Example 14 | S | 79.5 | 20.0 | 0.5 | 1.0 | 14.1 | 5 | 0.04 | ○ | Absent | ○ | 312 | 324 | 70,000 | 1.5 | 3.2 | 2.1 | 1.04 |
| Comparative Example 5 | T | 74.5 | 25.0 | 0.5 | 1.0 | 16.6 | 3 | 0.04 | ○ | Absent | ○ | 300 | 354 | 70,000 | 1.5 | 3.2 | 2.1 | 1.18 |
| Example 15 | U | 84.5 | 15.0 | 0.5 | 1.0 | 12.4 | 8 | 0.21 | ○ | Absent | ○ | 351 | 412 | 70,000 | 1.5 | 3.2 | 2.1 | 1.17 |
| Comparative Example 6 | V | 95 | — | 1.0 + acrylic acid 4.0 | 1.0 (TDI) | 13.1 | 13 | 2.31 | ○ | Absent | × | 600 | 9,250 | 70,000 | 3.4 | 1.7 | 0.5 | 15.42 |
| Comparative Example 7 | A' | 84.8 | 15.0 | 0.2 | 0.0 | 15.5 | 11 | 0.02 | Cf | Absent | ○ | 321 | 365 | 1,655 | 0.6 | 0.0 | 0.0 | 1.14 |
| Example 16 | B' | 84.8 | 15.0 | 0.2 | 0.3 | 13.8 | 9 | 0.02 | ○ | Absent | ○ | 312 | 355 | 70,000 | 0.6 | 0.93 | 1.55 | 1.14 |
| Example 17 | C' | 84.8 | 15.0 | 0.2 | 0.5 | 13.5 | 7 | 0.03 | ○ | Absent | ○ | 301 | 359 | 70,000 | 0.6 | 1.55 | 2.58 | 1.19 |
| Example 18 | D' | 84.8 | 15.0 | 0.2 | 0.7 | 13.3 | 7 | 0.02 | ○ | Absent | ○ | 305 | 395 | 70,000 | 0.6 | 2.17 | 3.62 | 1.30 |
| Example 19 | E' | 84.8 | 15.0 | 0.2 | 0.9 | 11.3 | 7 | 0.03 | ○ | Absent | ○ | 291 | 381 | 70,000 | 0.6 | 2.80 | 4.67 | 1.31 |
| Example 20 | F' | 84.8 | 15.0 | 0.2 | 1.7 | 10.0 | 6 | 0.03 | ○ | Absent | ○ | 281 | 379 | 70,000 | 0.6 | 5.27 | 8.78 | 1.35 |
| Example 21 | G' | 84.8 | 15.0 | 0.2 | 2.5 | 8.5 | 5 | 0.03 | ○ | Absent | ○ | 269 | 356 | 70,000 | 0.6 | 7.75 | 12.92 | 1.32 |

TABLE 1-continued

| Examples and Comparative Examples | Pressure-sensitive adhesive | (A) BA part(s) by mass | (B) ACMO part(s) by mass | (C) HEA part(s) by mass | (D) Addition amount of XDI part(s) by mass | Adhesion (N/25 mm) | Ball tackiness (No.) | Amount of generated outgases (μg/cm2) | Removability | Remaining NCO groups | Corrosiveness in copper plate | Release forces (mN/50 mm) Ordinary state | Release forces (mN/50 mm) Thermally accelerated state | Holding power (seconds) | OH (10⁻³ mol) | NCO (10⁻³ mol) | M2/M1 (NCO/OH) | Release force ratio (at a thermally accelerated state/at an ordinary state) |
|---|---|---|---|---|---|---|---|---|---|---|---|---|---|---|---|---|---|---|
| Comparative Example 8 | H' | 84.8 | 15.0 | 0.2 | 3.3 | 6.5 | 4 | 0.03 | ○ | Present | ○ | 272 | 391 | 70,000 | 0.6 | 10.23 | 17.05 | 1.44 |

The above-mentioned results confirm that the adhesive sheets obtained in the examples each show a high adhesion. In addition, the results confirm that the sheets each show excellent results in the removability test on the stainless steel plate and the corrosiveness test on the copper plate, and that the sheets each generate a sufficiently small amount of outgases.

On the other hand, it is found that Comparative Example 1 using a large amount of 2-hydroxyethyl acrylate serving as the component (C), i.e., the functional group-containing unsaturated monomer (having a small value for the ratio M2/M1) shows a low adhesion and is poor in ball tackiness. Further, it is confirmed that Comparative Example 2 and Comparative Example 3 each having a small value for the ratio M2/M1 each show a low holding power and are each poor in removability.

Comparative Example 4 that does not use N-acryloylmorpholine serving as the component (B), i.e., the ethylenically unsaturated group-containing morpholine-based compound does not provide a sufficient adhesion, and is poor in removability and holding power. It is found that Comparative Example 5 using 25 parts of N-acryloylmorpholine shows a large adhesion but is poor in ball tackiness.

Further, it is found that Comparative Example 6 using the acrylic pressure-sensitive adhesive containing a structure derived from acrylic acid involves no problems in terms of its adhesion and removability but is not preferred because the comparative example generates a large amount of outgases, shows a bad result in terms of corrosiveness in copper plate, and has a large ratio of the release force at thermally accelerated state to the release force at an ordinary state.

Comparative Example 7 not using the component (D), i.e., the isocyanate-based cross-linking agent does not provide a sufficient holding power and is also poor in removability.

Comparative Example 8 using a large amount of XDI serving as the component (D), i.e., the isocyanate-based cross-linking agent does not provide a sufficient adhesion, contains remaining NCO groups, and has a large release force ratio.

Industrial Applicability

The adhesive sheet of the present invention has a high adhesion particularly for a metal adherend and is excellent in removability. In addition, the adhesive sheet is free of any carboxyl group, and hence the adhesive sheet does not corrode a metal so much and generates only small amount of outgases. Accordingly, the adhesive sheet is particularly useful as an adhesive sheet for being adhered to an electronic part.

The invention claimed is:

1. A process for reducing the possibility of malfunction of an electronic part which comprises adhering an adhesive sheet to the electronic part, wherein the adhesive sheet comprises an adhesive layer provided on at least one surface of a substrate sheet,
   wherein a pressure-sensitive adhesive of which the adhesive layer is formed comprises a resin composition comprising an acrylic copolymer obtained by blending a carboxyl group-free acrylic copolymer obtained by copolymerizing the following components (A) to (C) with (D) an isocyanate-based cross-linking agent:
   (A) 76.999 to 94.999% by mass of an alkyl(meth)acrylate;
   (B) 5.0 to 23.0% by mass of an ethylenically unsaturated group-containing morpholine-based compound; and
   (C) 0.001 to 1.5% by mass of a functional group-containing unsaturated monomer; and
   a ratio M2/M1 of a mole number (M2) of isocyanate groups in the component (D) to a mole number (M1) of functional groups in the component (C) is 1.5 to 15.0.

2. The process according to claim 1, wherein the ratio M2/M1 is 2.0 to 10.0.

3. The process according to claim 1, wherein a functional group of the functional group-containing unsaturated monomer (C) is a hydroxyl group.

4. The process according to claim 1, wherein the isocyanate-based cross-linking agent (D) comprises a xylylene diisocyanate.

5. The process according to claim 1, wherein the alkyl (meth)acrylate (A) comprises n-butyl acrylate.

6. The process according to claim 1, wherein a release layer surface of a release sheet formed of a release substrate and a non-silicone-based release layer is laminated on an adhesive layer surface of the adhesive sheet.

7. The process according to claim 1, wherein the adhesive sheet generates outgases in an amount of less than 0.5 $\mu g/cm^2$ in terms of n-decane.

8. The process according to claim 1, wherein the electronic part comprises a hard disk drive.

9. The process according to claim 1, wherein component (A) is present in an amount of 80.0 to 90.0% by mass.

10. The process according to claim 1, wherein component (A) is present in an amount of 80.0 to 85.0% by mass.

11. The process according to claim 1, wherein component (B) is present in an amount of from 10.0 to 20.0% by mass.

12. The process according to claim 1, wherein component (C) is a hydroxyalkyl(meth)acrylate.

13. The process according to claim 1, wherein component (C) is present in an amount of about 0.1 to 1.2% by mass.

14. The process according to claim 1, wherein component (C) is present in an amount of about 0.2 to 0.8% by mass.

15. The process according to claim 1, wherein the carboxyl group-free acrylic copolymer has a weight-average molecular weight of 200,000 or more.

16. The process according to claim 1, wherein the carboxyl group-free acrylic copolymer has a weight-average molecular weight of 400,000 to 2,000,000.

17. The process according to claim 1, wherein the carboxyl group-free acrylic copolymer has a weight-average molecular weight of 500,000 to 1,000,000.

18. The process according to claim 1, wherein M2/M1 is 2.5 to 8.0.

19. The process according to claim 1, wherein the adhesive sheet generates outgases in an amount of less than 0.3 $\mu g/cm^2$ in terms of n-decane.

20. The process according to claim 1, wherein M2/M1 is 1.5 to 9.0.

21. The process according to claim 6, wherein the non-silicone-based release layer comprises a 1,4-polybutadiene.

* * * * *